United States Patent [19]

Brady

[11] 3,777,269

[45] Dec. 4, 1973

[54] BINARY MODULATOR FOR COHERENT PHASE-SHIFT KEYED SIGNAL GENERATION

[75] Inventor: Douglas MacPherson Brady, Middletown, N.J.

[73] Assignee: Bell Telephone Laboratories, Incorporated, Murray Hill, N.J.

[22] Filed: Apr. 12, 1972

[21] Appl. No.: 243,254

[52] U.S. Cl. .............. 325/163, 178/66 R, 332/16 R

[51] Int. Cl. .............................................. H04l 27/20

[58] Field of Search .................. 178/66, 67; 325/30, 325/163; 332/16 R

[56] References Cited

UNITED STATES PATENTS 3,142,723 7/1964 Fleming ................................ 178/66

3,190,958 6/1965 Bullwinkel et al. .................. 178/66

3,585,503 6/1971 Rittenbach......................... 325/163

*Primary Examiner*—Eugene G. Botz

*Assistant Examiner*—R. Stephen Dildine, Jr.

*Attorney*—W. L. Keefauver et al.

[57] ABSTRACT

A binary modulator for encoding the two states of an input binary signal which is synchronized to a clock signal into two phase deviations of a frequency modulated coherent phase-shift keyed signal. The modulator first encodes the binary signal into a frequency modulated coherent frequency-shift keyed signal having first and second frequencies which differ by a multiple of the clock frequency. Phase-to-frequency conversion apparatus is then provided for translating the information contained in the frequencies of the frequency-shift keyed signal into phase shifts of a second signal which is the desired frequency modulated coherent phase-shift keyed signal.

10 Claims, 3 Drawing Figures

BINARY MODULATOR FOR COHERENT PHASE-SHIFT KEYED SIGNAL GENERATION

BACKGROUND OF THE INVENTION

This invention relates to binary data transmission and, more particularly, to modulators for use in such transmission.

In recent times, it has become prevalent to transmit binary data via frequency modulated signals, i.e., signals having a constant amplitude envelope and a continuous phase. In frequency modulated phase shifted keyed (FM-PSK) systems, the two different amplitude levels of the binary data are encoded into two different phase-shifts or phase deviations of the FM signal. The encoding process is typically carried out via a binary modulator comprising a voltage controlled oscillator (VCO). More particularly, the binary data is first synchronized to a clock signal frequency which causes the data bits to occupy successive time slots equal in extent to the clock period. The synchronized binary signal is then applied to the VCO, which generates a first frequency output during time slots in which the binary data is at one of its amplitude levels and a second frequency output during time slots in which the binary data is at its other amplitude level. The first frequency output results in a first phase-shift over its respective time slots, while the second frequency output results in a second phase-shift over its associated time slots. The two phase-shifts of the VCO output signal are thus a direct measure of the two different states of the binary input.

Since the output frequency of the VCO is subject to short term variations due, in part, to drift in the applied bias voltage, a FM-PSK signal generated using such an oscillator will also experience short term drift in its encoded frequencies, and, thus, its encoded phase-shifts. As a result, the methods available for detecting the phase-shifts of such a signal are limited. In particular, use of coherent detection arrangements (i.e., arrangements which make use of a local oscillator locked to one or the other of the signal frequencies) is virtually precluded because of extreme difficulty in establishing a locked condition. Use of coherent detection, however, is most advantageous in that it is impaired less by noise, intersymbol interference and interference from other signals than is any other mode of detection.

In order to employ coherent detection techniques, it is thus required that a frequency modulated coherent phase-shift keyed (FM-CPSK) signal be developed i.e., a FM-PSK signal whose component frequencies are stable and not subject to drift or change over short periods of time. Generation of a coherent signal is best realized by using a stable crystal oscillator as a generating source rather than a VCO. The prior art shows arrangements in which two different frequencies, derived from such a source, are gated by the synchronized binary data, thereby resulting in a coherent output during each of the data bit time slots. For the aforesaid coherent output signal to be an FM signal (i.e., for it to have continuous-phase), however, the two coherent frequencies corresponding to the two binary states must differ by a multiple of the clock frequency. If this condition is met, however, the phase-shifts generated by the different coherent frequencies over one time slot will always be at the same phase point, and, thus will not be distinguishable. Thus, while a frequency-modulated, coherent signal which carries the digital data via two different frequencies (i.e., a frequency modulated coherent frequency-shift keyed (FM-CFSK signal)) can be generated by the aforesaid arrangements a FM-CPSK signal cannot be generated.

It is, therefore, a broad object of the present invention to provide a binary modulator for generating a FM-CPSK signal.

SUMMARY OF THE INVENTION

In accordance with the principles of the present invention, the above and other objectives are realized by a modulator wherein the input binary data is first synchronized to a clock signal and then encoded into the frequencies of a FM-CFSK signal. The latter signal is generated by using the data to gate two synchronously developed coherent frequencies which differ by a multiple of the inverse of the clock signal period. The FM-CFSK signal is then applied to a frequency-to-phase information conversion device which encodes the frequency information occurring during each data time slot into a phase-shift over the time slot, while not affecting the coherency and continuity of the signal. The resultant output signal of the converter is the desired FM-CPSK signal.

In the particular embodiment disclosed, the gated frequencies differ by the inverse of one clock period and the frequency-to-phase information converter comprises a conventional frequency divider network which performs a frequency and thus phase division of the FM-CFSK signal.

DESCRIPTION OF THE DRAWINGS

The above and other features and aspects of the present invention will become more apparent upon consideration of the following detailed description taken in conjunction with the following drawings in which.

DETAILED DESCRIPTION

Figure 1:
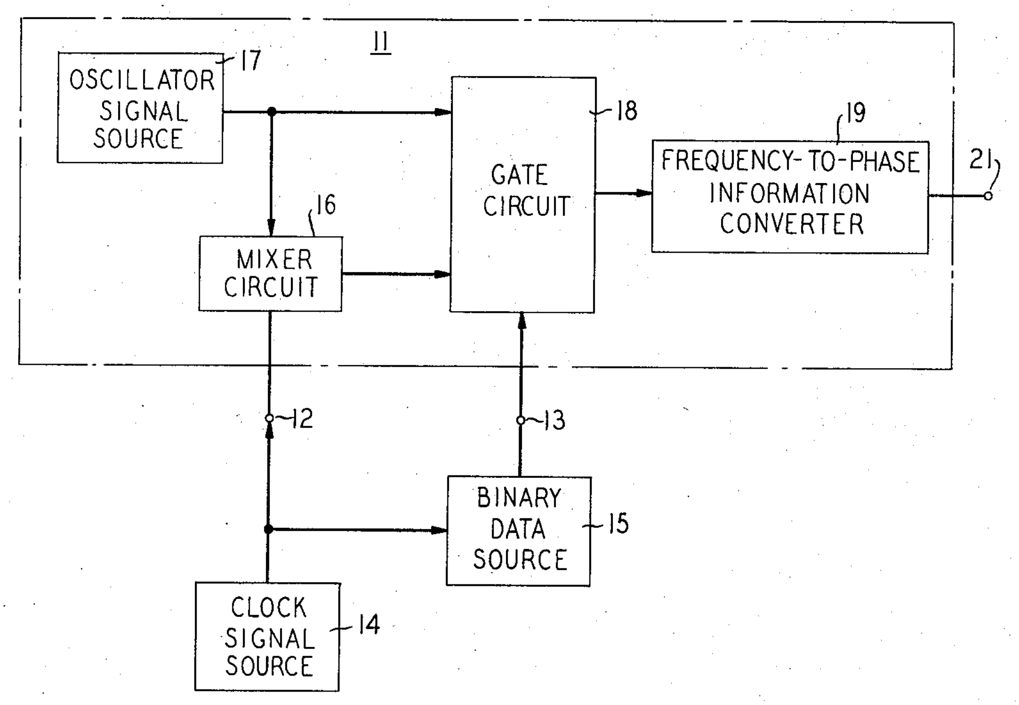
FIG. 1 shows a binary modulator in accordance with the principles of the invention.

In FIG. 1, a binary modulator 11 for developing a FM-CPSK signal, in accordance with the principles of the invention, is illustrated. Modulator 11 comprises first and second signal input ports 12 and 13 which receive input signals generated by clock signal source 14 and binary data source 15, respectively. Port 12 couples the signal energy fed thereto to a mixer circuit 16 which is additionally fed energy by an oscillator signal source 17. The output of mixer 16 is coupled to a gate circuit 18 as is the output of oscillator 17. The gate circuit is controlled by the signal energy applied to port 13, which port is also coupled to the gate. The output of gate 18 is coupled to a frequency-to-phase information converter 19 whose output is coupled from the modulator via output port 21 and comprises the desired FM-CPSK signal.

The operation of modulator 11 will be discussed by making reference to the signals shown in FIG. 2.

In operation, clock signal source 14 develops a coherent, cosinusoidal clock signal 21 having a frequency $f_s$ and a period T equal to $1/f_s$. The latter signal is applied via input port 12 to mixer 16 of modulator 11.

Also appied to mixer 16 is a second coherent cosinusoidal signal 22 which is developed by oscillator 17 of the modulator.

In the instant illustrative embodiment, oscillator signal 22 is synchronized with clock signal 21 (circuitry for realizing such synchronization is well known in the art and, thus, has been omitted from the drawing) and, in addition, the frequency $f_m$ of the oscillator signal is an integer multiple K of the clock frequency $f_s$. While, the latter two conditions are preferable, they are not intended to be limitations on the invention. For the particular illustrative signals of FIG. 2, the integer K is equal to 4, i.e., for every one cycle of the clock signal the oscillator signal goes through 4 cycles.

Mixer circuit 16 mixes the signals 21 and 22 and develops an output signal 23 which is at the difference frequency $(f_m - f_s)$ of the mixed signals. It is important to note, that since signals 22 and 23 differ by the clock frequency $f_s$, that at the end of each successive T second time interval or slot (i.e., time slots (O–T), (T–2T), (2T–3T), etc.), the signals are at the same phase. In the particular illustrative case, since the difference signal 23 goes through three complete cycles during each time slot and the signal 22 goes through 4 complete cycles, both signals are at zero phase at the end of each slot. The afore said phase conditions of signals 22 and 23 are readily apparent from FIG. 2, which shows both signals 22 and 23 at their maximum positive amplitudes at the end of each of the depicted T second time slots.

Signals 22 and 23 are coupled from their respective sources to gate circuit 18 whose operation is controlled by a binary data signal 24 which is derived from binary source 15 and which is coupled to the gate via input signal port 13.

Binary source 15 is synchronized to the clock frequency $f_s$ such that the generated binary signal 24 has a single data bit in each of the successive T second time slots, as shown. The upper amplitude level of signal 24 represents one of its encoded states and will be designated herein as a 1 bit. The lower level, on the other hand, represents the other state of signal 24 and it is designated herein as a 0 bit. It is noted that the first bit of the signal carries no information. This bit is used for reference purposes and can be arbitrarily selected as a 1 or 0 bit. The former choice has been made in the present illustrative case.

As indicated hereinabove, binary signal 24 keys or controls the gating operation of gate 18 with respect to the transmission of signals 22 and 23. In particular, when signal 24 is at its upper amplitude level (i.e., during transmission of each 1 bit), the gate circuit permits transmission of signal 22, while it inhibits transmission of signal 23. Conversely, when signal 24 is at its lower amplitude level (i.e., during transmission of each 0 bit) the gate inhibits signal 22, while it transmits signal 23.

The aforesaid gating action thus causes each 1 bit to be encoded into the coherent frequency $f_m$ (frequency of signal 22) and each 0 bit to be encoded into the difference frequency $(f_m - f_s)$ (frequency of signal 23), as is indicated by gate output signal 25. Moreover, since each of the signals 22 and 23 is at the same phase at the end of each time slot, the phase of gate output 25 remains continuous at all transitions from one data bit to the next. As a result, signal 25 is both coherent (since it is composed of the coherent frequencies $f_m$ and $(f_m - f_s)$ ) and continuous and thus can be characterized as FM-CFSK signal.

Gate output signal 25 is coupled to a frequency-to-phase information converter 19 wherein the encoded frequencies of the signal are themselves encoded into relative signal phase-shifts over their respective time slots. More particularly, converter 19 performs a frequency division and thus a phase division of signal 25. Such frequency division, while not affecting the coherency or phase continuity properties already established, results in a signal whose relative phase change during each of the T second time slots corresponds to the frequency of signal 25 occurring during that time slot.

In the present illustrative embodiment, converter 19 divides the frequency and phase of signal 25 by 2, resulting in an output FM-CPSK signal 26. The phase of signal 26 at the end of each time slot and the corresponding phase change or deviation during each time slot are indicated in FIG. 2. The latter phase values and phase deviations are with respect to a reference signal at the center frequency $f_c/2$ of signal 26, where $f_c/2$ is equal to $(f_m - f_s/2)/2$. As is apparent, the encoded frequency $f_m$ of signal 25 has been itself encoded into a phase deviation over each time slot where it appears of $+\pi/2$ radians, while the encoded frequency $(f_m - f_s)$ has been encoded into a phase deviation of $-\pi/2$ radians over each of its respective time slots.

Analagously, therefore, a phase deviation of signal 26 of $+\pi/2$ radians during a particular time slot corresponds to transmission of a 1 bit during the slot while a phase change of $-\pi/2$ radians corresponds to the transmission of a 0 bit.

It should be noted that while converter 19 was assumed to divide the phase and frequency of signal 25 by 2 that division by any other number is also possible. In such cases, however, the phase deviations of the resultant FM-CPSK signal corresponding to the two frequencies of signal 25 will be different from those illustrated in FIG. 2. Thus, for example, if the converter divided the frequency and phase of signal 25 by 4, the phase deviations of the resultant FM-CPSK signal corresponding to the 1 and 0 bits of signal 24 would be one-half those obtained when dividing signal 25 by 2, i.e., a phase deviation of $+\pi/4$ would result for each 1 bit, while a phase deviation of $-\pi/4$ would result for each 0 bit.

Another point to note is that the frequency of the reference signal which was used to obtain the phase deviations of signal 26 over the time slots can be other than $f_c/2$. Thus, a frequency of $f_m/2$ for example could also be used. Use of the latter frequency, however, would result in different phase values at the end of each time slot and in turn different phase deviations over the slots. More particularly, for a reference signal at the frequency $f_m/2$, the resultant phase deviation of signal 26 would be $\pi$ radians during transmission of a 0 bit and 0 radians during transmission of a 1 bit.

Retrieval of the original data from signal 26 can be readily realized by coherently detecting the phase of the signal and then comparing the detected phase values at the beginning and end of each time slot to obtain the phase deviation during that slot. More particularly, coherent detection of the phase of signal 26 can be accomplished by mixing the signal in a mixer circuit with a local oscillator signal which is at either one or the other of the frequencies of signal 26 (i.e., at $f_m/2$ or $(f_m$ $-f_s)/2$). The phase of the local oscillator is set so that it is either exactly in phase or exactly out-of-phase with its corresponding frequency of signal 26. The mixer circuit output is then applied to a conventional phase detector circuit which samples the phase at the beginning and end of each time slot. If a local oscillator signal at $f_m/2$ is used, then the detector classifies the sampled phase values as either 0 or $\pi$. If the phase values at the beginning and end of a slot are classified the same (i.e., both as 0 or both as $\pi$), then a 0 phase deviation (i.e., a 1 bit) is detected. If the phase values at the beginning and end of a slot are classified differently (i.e., one is a 0 and the other a $\pi$), then a $\pi$ phase deviation (i.e., a 0 bit) is detected.

Figure 3:
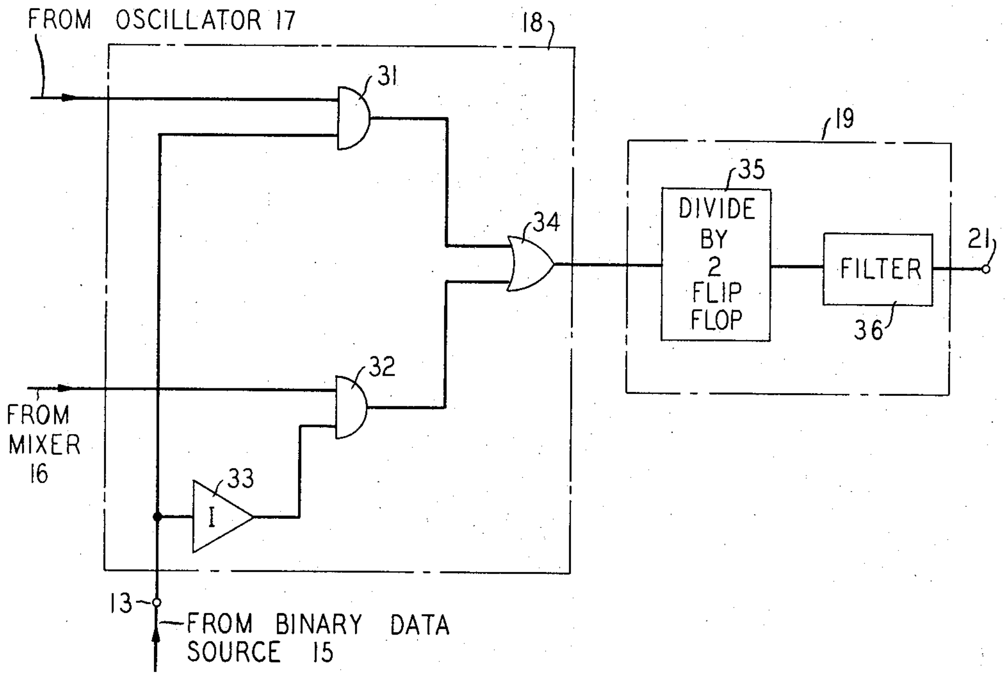
FIG. 3 shows in more detail the gate circuit and conversion circuit of the modulator of FIG. 1.

In FIG. 3 one arrangement for realizing gate circuit 18 and frequency-to-phase information converter 19 is shown. As illustrated, gate circuit 18 comprises two similar AND gates 31 and 32 which receive respectively the signals 22 and 23 from oscillator 17 and mixer 16. Gate 31 additionally is fed a control or keying signal comprising the binary data signal applied to modulator 11 via input port 13. Gate 32 on the other hand is controlled or keyed by an inverted form of the data signal which is developed by passing the latter signal through inverter 33 prior to coupling it to gate 32. The output of each gate is coupled to an OR gate 34 whose output serves as the output of circuit 18. The latter ouptut is coupled to converter 19 which is illustrated as comprising a divide by 2 flip-flop circuit 35 followed by filter circuit 36. The output of the filter 36 serves at the output of converter 19 and is coupled to output port 21 of the modulator.

In operation, binary signal 24 and the inverted signal from inverter 33 key the transmission of signals 22 and 23, respectively, through the gates 31 and 32. In particular, each gate circuit permits transmission when its respective keying signal is at its upper amplitude level. For gate 31 this occurs when the data signal is at its upper level, while for gate 32 this occurs when the data signal is at its lower amplitude level (at this time the inverted data signal is at its upper level). Thus, during transmission of each 1 bit the signal 22 is coupled to OR gate 34 while during transmission of each 0 bit the signal 23 is coupled to the latter gate. Gate 34 merely acts as a summing circuit and sums the aforesaid signals, thus developing the FM-CFSK signal 25 shown in FIG. 2.

The OR gate output signal (i.e., signal 25) is then coupled to divide by 2 flip-flop circuit 35 of converter 19. The flip-flop develops an output signal which changes state once for every cycle of the input signal 25. The flip-flop output is then passed through filter 35 to obtain the output FM-CPSK signal 26 shown in FIG. 2.

Figure 2:
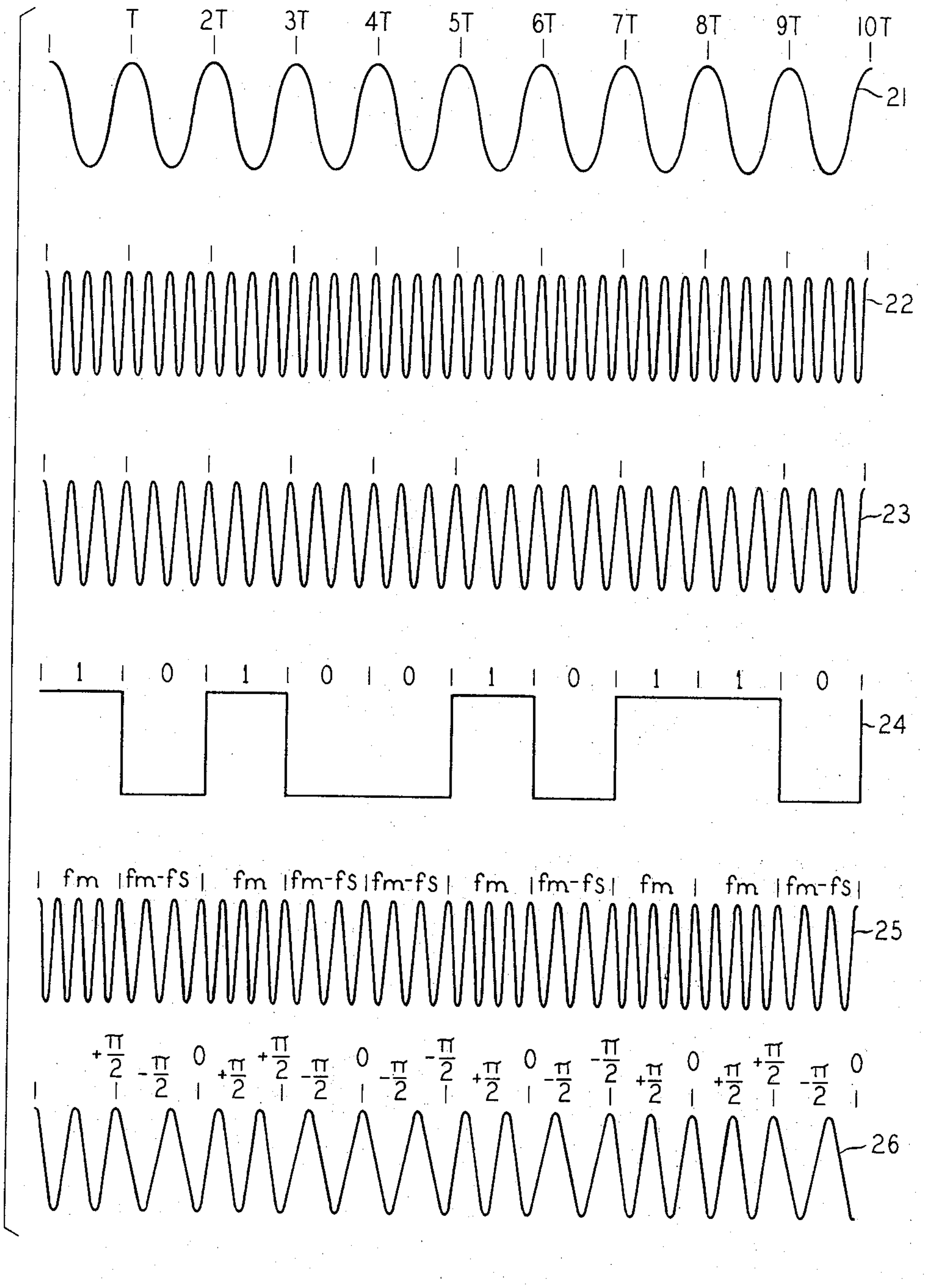
FIG. 2, included for purposes of explanation, illustrates the signals at different points of the modulator of FIG. 1.

Having discussed the operation of modulator 11 of FIG. 1 in terms of the signals of FIG. 2, a more rigorous mathematical explanation of the operation will now be presented. More particularly, the cosinusoidal clock signal $s_1$ developed by source 14 can be represented as $$s_1 = \cos 2\pi f_s t$$

The latter signal and the synchronous signal $s_2$ from oscillator 17, where $s_2$ is given as $$s_2 = \cos 2\pi f_m t \tag{2}$$

are mixed in mixer 16 resulting in an output difference frequence signal $s_3$ which has the form $$s_3 = \cos 2\pi(f_m - f_s)t \tag{3}$$

The signals $s_2$ and $s_3$ are gated through gate circuit 18 in response to the binary data signal developed by source 15, which signal is synchronized to the clock signal 14. The binary data signal $s_4$ can thus be represented as $$s_4 = \sum_{k=0}^{\infty} a_k \operatorname{rect}(t - kT) \tag{4}$$

where
rect $(t) = 0$ for $t < 0$ and $t > T$
$= 1$ for $0 \leq t \leq T$
$a_k = \pm 1$
and T is the time slot of each data bit and is equal to the period of the clock signal (i.e., $1/f_s$).

The gate 18 transmits the signal $ss_2$, when $a_k$ is + 1 (i.e., at its upper level) and the signal $s_3$ when $a_k$ is $-1$ (i.e., at its lower level). The resultant output from gate 18 is thus a FM-CFSK signal which can be represented as $$s_5 = \cos\left[\, 2\pi f_c t + \pi f_s \int_0^t \sum_{k=0}^{\infty} a_k \operatorname{rect}(t' - kT) dt' \,\right] \tag{5}$$

where $f_c$ is the center frequency of $s_5$ and is given as ($f_m - f_s/2$).

The frequency of the signal $s_5$, as indicated above, is either at the frequency $f_m$ ($s_2$ transmitted) or the frequency ($f_m - f_s$) ($s_3$ transmitted) during each time slot, depending upon the level of the binary signal. This can be readily shown as follows. The frequency $f$ of $s_5$ is given as $$f = f_c + \frac{f_s}{2} \sum_{k=0}^{\infty} a_k \operatorname{rect}(t' - kT)\, dt'. \tag{6}$$

During the $N^{th}$ time slot, where $N$ is an integer greater than $O$, the function rect($t$) is zero for all $k = (N-1)$ and 1 for $k = (N-1)$. Thus, the expression for f given in equation (6) during the $N^{th}$ time slot reduces to $$f = f_c + \frac{f_s}{2} a_{N-1} \tag{7}$$

Substituting the expression for $f_c$ results in $$f = f_m - \frac{f_s}{2} + \frac{f_s}{2} a_{N-1} \tag{8}$$

Rearranging equation (8) gives $$f = f_m + \frac{f_s}{2} (a_{N-1} - 1) \tag{9}$$

From equation (9), therefore, it is readily apparent that if $a_{N-1}$ is +1 during the time slot, the frequency $f$ will be $f_m$ and, on the other hand, if $a_{N-1}$ is −1 during the time slot the frequency $f$ will be $(f_m-f_s)$.

As above indicated, the phase of the signal $s_5$ is continuous at the transition points between time slots. The expressions for the aforesaid phase at the end of the $N^{th}$ slot, relative to the phase of the center frequency $f_c$ is given as the continuous function $$\theta_N = + \pi f_s \int_0^{NT} \sum_{k=0}^{\infty} a_k \operatorname{rect}(t'-kT)\,dt' \quad (10)$$

Expression (10) can be rewritten as $$\theta_N = \pi f_s T \sum_{k=0}^{N-1} a_k = \pi \sum_{k=0}^{N-1} a_k \quad (11)$$

As also, above-indicated, the signal $s_5$ carries no information in the phase change or deviation occurring over each time slot, since the phase deviations during the transmission of both states of signal $s_4$ cannot be distinguished. The aforesaid phase deviation of signal $s_5$ during the $N^{th}$ time slot can be written as $$\Delta\theta_N = \theta_N - \theta_{N-1} = \pi f_s T \sum_{k=0}^{N-1} a_k - \pi f_s T \sum_{k=0}^{N-2} a_k \quad (12)$$

$$\Delta\theta_N = \pi f_s T a_{N-1} \quad (13)$$

Simplifying result in $$\Delta\theta_N = \pi a_{N-1} \quad (14)$$

The phase deviation of the signal $s_5$ is thus $-\pi$ when $a_N$-1=−1 and $+\pi$ and when $a_N$-1=+1. Since the phases $+\pi$ and $-\pi$, however, are actually at the same phase point, they cannot be distinguished one from the other and, as a result, cannot be used to carry information.

The signal $s_5$ is coupled to converter 19 where its frequency and, thus, phase are divided by 2. The resultant signal $s_6$ encodes the frequency information contained in each time slot of $s_5$ into a frequency shift over the time slot and is, thus, the desired FM-CPSK signal. The signal $s_6$ is given as $$s_6 = \left[ \cos \pi f_c t + \frac{\pi f_s}{2} \int_0^t \sum_{k=0}^{\infty} a_k \operatorname{rect}(t'-kT)\,dt' \right] \quad (15)$$

The phase of the signal $s_6$ remains continuous at the ends of the time slots, the latter phase at the end of the $N^{th}$ time slot relative to the phase of reference signal at the center frequency $f_c/2$, being given as the continuous function $$\theta'_N = \frac{\pi f_s}{2} T \sum_{k=0}^{N-1} a_k \quad (16)$$

Simplifying yields $$\theta'_N = \frac{\pi}{2} \sum_{k=0}^{N-1} a_k \quad (17)$$

The phase deviation over the $N^{th}$ time slot is expressed as $$\Delta\theta'_N = \theta'_N - \theta'_{N-1} = \frac{\pi}{2} \sum_{k=0}^{N-1} a_k - \frac{\pi}{2} \sum_{k=0}^{N-2} a_k \quad (18)$$

Simplifying results in $$\Delta\theta'_N = \frac{\pi}{2} a_{N-1} \quad (19)$$

The phase deviations of signal $s_6$, as indicated aforesaid, are thus either $+\pi/2$ or $-\pi/2$ depending upon whether the data over the slot is in its +1 or −1 state, respectively. The binary states of the signal $s_4$ have thus been encoded into the phase deviations of the coherent, continuous phase signal $s_6$.

In all cases, it is understood that the above-described arrangements are merely illustrative of some of the possible specific embodiments which represent applications of the present invention. Numerous and varied other arrangements can be readily devised in accordance with these principles without departing from the spirit and scope of the invention.

What is claimed is:

1. A binary modulator responsive to an input binary signal, said binary signal being synchronized to a coherent clock signal such that each data bit of said binary signal occurs within a time slot equal to the period T of said clock signal, comprising:

means for developing a frequency modulated coherent frequency-shift keyed signal having a first frequency during the time slots in which said binary signal is in one state and a second frequency differing from said first frequency by a multiple of $1/T$ during the time slots in which said binary signal is in its other state;

and frequency-to-phase information conversion means for converting said frequency modulated coherent frequency-shift keyed signal into a frequency modulated coherent phase-shift keyed signal whose phase deviation during each time slot contains the information contained in the respective frequency of said frequency-shift keyed signal occurring during that time slot.

2. A binary modulator in accordance with claim 1 in which said first and second frequencies differ by 1/T.

3. A binary modulator in accordance with claim 1 in which said conversion means comprises a frequency divider circuit for dividing the frequency and phase of said frequency-shift keyed signal.

4. A binary modulator in accordance with claim 3 in which said divider circuit divides the frequency and phase of said frequency-shift keyed signal by 2.

5. A binary modulator in accordance with claim 4 in which said frequency divider circuit comprises:

a divide by two flip-flop circuit for receiving said frequency-shift keyed signal;

and a filter network for receiving the output of said divide by two flip-flop.

6. A binary modulator in accordance with claim 1 in which said means for developing said frequency-shift keyed signal comprises:

an oscillator signal source for generating a signal at said first frequency;

a mixer circuit for mixing said oscillator signal and said clock signal to produce a difference frequency signal at said second frequency;

and a gate circuit for transmitting said oscillator signal to said conversion means when said binary signal is in said one state and for transmitting said difference frequency signal to said conversion means when said binary signal is in said other state.

7. A binary modulator in accordance with claim 6 in which said gate circuit comprises:

an inverter circuit for inverting said binary signal;

a first AND gate responsive to said binary signal and said oscillator signal;

a second AND gate responsive to said inverted binary signal and said difference frequency signal;

and an OR gate for receiving the outputs from said first and second AND gates.

8. A binary modulator in accordance with claim 6 in which said oscillator source is synchronized to said clock signal.

9. A binary modulator in accordance with claim 6 in which said first frequency is a multiple of 1/T.

10. A method for generating a frequency modulated coherent phase-shift keyed signal from a binary signal which is synchronized to a coherent clock signal such that each data bit of said binary signal occurs within a time slot equal to the period T of said clock signal comprising the steps of:

forming a frequency modulated coherent frequency-shift keyed signal having a first frequency during the time slots in which said binary signal is in one state and a second frequency differing from said first frequency by a multiple of 1/T during the time slots in which said binary signal is in its other state;

and dividing the frequency and phase of said frequency modulated coherent frequency-shift keyed signal to produce a frequency modulated coherent phase-shift keyed signal whose phase deviation during each time slot contains the information contained in the respective frequency of said frequency-shift keyed signal occurring during that time slot.

* * * * *